United States Patent [19]

Moore

[11] Patent Number: 4,948,852
[45] Date of Patent: Aug. 14, 1990

[54] PEROXIDE-CURABLE FLUOROELASTOMERS AND CHLOROFLUOROELASTOMERS HAVING BROMINE AND IODINE CURESITES AND THE PREPARATION THEREOF

[75] Inventor: Albert L. Moore, Wilmington, Del.

[73] Assignee: E. I. Du Pont de Nemours and Company, Wilmington, Del.

[21] Appl. No.: 426,931

[22] Filed: Oct. 26, 1989

[51] Int. Cl.$^5$ .............................................. C08F 16/24
[52] U.S. Cl. ..................................... 526/247; 526/206; 526/249
[58] Field of Search ........................ 526/247, 206, 249

[56] References Cited

U.S. PATENT DOCUMENTS

| | | | |
|---|---|---|---|
| 4,564,662 | 1/1986 | Albin | 526/247 |
| 4,694,045 | 9/1987 | Moore | 526/247 |

FOREIGN PATENT DOCUMENTS 0153848  9/1985  European Pat. Off. ............ 526/247

Primary Examiner—Joseph L. Schofer
Assistant Examiner—N. Sarofin

[57] ABSTRACT

Peroxide-curable fluoroelastomers and chlorofluoroelastomers are prepared in the presence of iodinated compounds, with iodine bonding to a substantial number of terminal positions on the fluoroelastomer, and comprising up to 3 weight percent of bromine-containing units selected from fluoroolefins and perfluoroalkyl perfluorovinyl ethers, and complementally at least 97 weight percent of either units of vinylidene fluoride, one or more fluoroolefins, and optionally perfluoroalkyl perfluorovinyl ethers, or units of tetrafluoroethylene, perfluoroalkyl perfluorovinyl ether, and ethylene. The resulting fluoroelastomers have improved processability, excellent strength and compression set properties, and are useful in the preparation of injection molded shaft seals, gaskets and other molded parts. The fluoroelastomer is prepared by a continuous emulsion polymerization process.

22 Claims, No Drawings

PEROXIDE-CURABLE FLUOROELASTOMERS AND CHLOROFLUOROELASTOMERS HAVING BROMINE AND IODINE CURESITES AND THE PREPARATION THEREOF

FIELD OF THE INVENTION

This invention relates to fluoroelastomers having enhanced physical properties and to processes for preparing such fluoroelastomers. More particularly, this invention relates to fluoroelastomers and chlorofluoroelastomers containing bromine that are polymerized in the presence of iodinated compounds to form curesites at random points along the polymer chain and at the ends of the chains, and to continuous processes for preparing such elastomers.

Vinylidene fluoride-based fluoroelastomers such as copolymers of vinylidene fluoride with hexafluoropropylene, optionally with tetrafluoroethylene, have achieved outstanding commercial success, and may be crosslinked by use of bisphenol curing systems such as are described in U.S. Pat. No. 3,876,654.

Curing systems were subsequently developed that could crosslink fluoroelastomers with higher concentrations of tetrafluoroethylene and correspondingly lower concentrations of vinylidene fluoride than previously treatable. In systems described in U.S. Pat. Nos. 4,035,565 and 4,214,060, fluoroelastomer copolymers including bromine-containing fluoromonomer cure in the presence of a radical-generating peroxide and a crosslinking coagent, such as triallylisocyanurate. The present fluoropolymer represents an improvement over these references in that it has improved processibility and physical properties where crosslinked by peroxides.

Fluoroelastomers that contain iodo groups on the chain ends have been prepared, as described in U.S. Pat. No. 4,243,770, by semi-batch polymerizations carried out in the presence of iodine-containing fluorocarbon or a chlorofluorocarbon chain transfer agent. When the chain transfer agent contains two iodo groups, and when the polymerization is carried out under suitable conditions, most of the fluoroelastomer chains contain iodo groups at each end, and such polymers when treated with peroxide curing agents and a crosslinking coagent form a network by linking up of the chain ends. U.S. Pat. No. 4,243,770 also teaches the use of a copolymerizable iodo-containing fluoromonomer but since extensive chain transfer occurs at the iodo site, this monomer behaves as a branching site, and at high concentration gives gelled, difficultly processible fluoroelastomer.

The semi-batch polymerization taught by U.S. Pat. No. 4,243,770 is inherently slow. Moreover, when continuous, high-productivity emulsion copolymerization in the presence of iodo chain transfer agents is carried out, chain transfer by iodine is inefficient, so that not all chains have iodo groups at both ends, and vulcanizates prepared by peroxide cure have poor properties. In contrast, the present fluoropolymer provides a product with excellent properties that is prepared in a continuous emulsion polymerization process.

It is an object of this invention to provide fluoroelastomers that react with peroxide curing agents and crosslinking coagents to give unique polymer networks in which crosslinks are formed both at random points along the polymer chain and at the ends of the chains. It is an advantage of the present invention to provide polymers having excellent strength and compression set properties, as well as good processing characteristics. It is a further object of this invention to provide a continuous, high productivity process for the preparation of said peroxide-curable polymer. These and other objects, features and advantages of the invention will become apparent in the description of the invention that appears below.

SUMMARY OF THE INVENTION

The present invention provides a peroxide-curable fluoroelastomer, prepared by continuous emulsion polymerization in the presence of iodinated compounds of the formula $RI_n$, where R is a radical of 1-8 carbon atoms and selected from the group consisting of fluorocarbons and chlorofluorocarbons, I is iodine, and n is 1 or 2. The iodine is bonded at a substantial number of terminal positions on the fluoroelastomer. The amount of iodinated compound is sufficient to provide at least 0.1 weight percent iodine in the fluoroelastomer. The composition comprises (a) up to 3 weight percent, based on the total weight of the components (a) and (b) of polymer repeat units selected from the group consisting of fluoroolefins and fluorovinyl ethers, said units containing bromine and being present in an amount sufficient to provide 0.1-1.0 weight percent bromine in the fluoroelastomer, and (b) complementally, at least 97 weight percent, based on the total weight of components (a) and (b), of:

(1) polymer repeat units of vinylidene fluoride and polymer repeat units of one or more fluoroolefins copolymerizable therewith, said fluoroolefins containing 2-8 carbon atoms and at least as many fluorine atoms as carbon atoms, and optionally, polymer repeat units provided by perfluoroalkyl perfluorovinyl ethers, or (2) 32-60 mole percent of polymer repeat units of tetrafluoroethylene, 20-40 mole percent of polymer repeat units of perfluoroalkyl perfluorovinyl ether and 10-40 mole percent of polymer repeat units of ethylene.

According to another embodiment of this invention, there is provided a continuous emulsion polymerization process for preparing a peroxide-curable fluoroelastomer of the present invention.

DETAILED DESCRIPTION OF THE INVENTION

According to the present invention there is provided a peroxide-curable fluoroelastomer containing 0.1-1.0 weight percent, preferably 0.1-0.5 weight percent iodine, and having polymer repeat units of bromine-containing comonomer constituents, located in recurring random locations along the polymer chain, such that the polymer will contain 0.1-1.0 weight percent, preferably 0.15-0.6 weight percent bromine. An especially preferred component (a) is 4-bromo-3,3,4,4-tetrafluorobutene-1 hereinafter called BTFB. In addition to bromine cure sites located randomly along the fluoroelastomer chain, the invention includes iodine crosslinking sites located at terminal positions on the polymer chain. This can be accomplished by conducting the radical copolymerization of the above named monomers in the presence of an iodinated compound represented by $RI_n$, where R is a fluorocarbon or chlorofluorocarbon radical of 1-8 carbon atoms, I is iodine, and n is 1 or 2. In the course of the radically initiated copolymerization the iodinated compound acts as a chain transfer agent, resulting in a telomerization polymerization process in which a labile, iodine-containing chain end is formed, and the residue of the iodinated compound is attached to the other end of the polymer chain. If the iodinated compound has two iodine groups, the fluoroelastomer chain may therefore have iodine groups at each end. Examples of suitable $RI_n$ compounds are perhalogenated diiodides such as 1,3-diiodoperfluoro-n-propane, 1,4-diiodoperfluoro-n-butane, 1,3-diiodo-2-chloroperfluoro-n-propane, and 1,5-diiodo-2,4-dichloro-perfluoro-n-pentane and others known in the art. 1,4-Diiodoperfluoro-n-butane is especially preferred.

The amount of iodinated compound that will be employed is high enough to give extensive chain transfer and incorporation of a substantial level of iodine end groups. High chain transfer efficiency by the iodinated compound results in a fluoroelastomer with lower compound viscosity and a relatively narrow molecular weight distribution for desirable rheology and processing characteristics.

The concentration of iodine in the fluoroelastomer will depend upon the concentration of $RI_n$ in the polymerization medium and upon polymerization conditions, which will affect the chain transfer efficiency. The lower limit of iodine content in the fluoroelastomer is approximately that at which an effect on peroxide cure rate and vulcanizate properties is found. The upper limit of iodine content in the fluoroelastomer corresponds approximately to the practical lower limit on polymer viscosity, since higher concentrations of $RI_n$ give polymers with lower molecular weight and viscosity. The upper limit on iodine content also relates to the desired highest state of cure.

The polymers of this invention will contain bromine curesites introduced by the bromine-containing units of component (a) of the fluoroelastomer. These units may be a bromine-containing olefin, containing another halogen, preferably fluorine. Examples are bromotrifluoroethylene, 4-bromo-3,3,4,4-tetrafluorobutene-1 and a number of others noted in U.S. Pat. No. 4,035,565, previously cited, and these are incorporated herein by reference. Brominated fluorovinyl ethers useful in the invention include $CF_2Br—Rf—O—CF=CF_2$, such as $CF_2BrCF_2OCF=CF_2$, cited in U.S. Pat. No. 4,745,165 and of the type $ROCF=CFBr$ or $ROCBr=CF_2$ where R is a lower alkyl group or fluoroalkyl group, such as $CH_3OCF=CFBr$ or $CF_3CH_2OCF=CFBr$, cited in U.S. Pat. No. 4,564,662. The choice of bromine-containing units is based on ease of copolymerizability with the major monomers and low branching tendency, in addition to cost and availability.

Several useful embodiments of the present invention differ with respect to the composition of component (b)(1) of the fluoroelastomer. One such composition contains polymer repeat units of vinylidene fluoride and polymer repeat units of either hexafluoropropylene or pentafluoropropylene. In another composition, the component (b)(1) includes polymer repeat units of vinylidene fluoride, polymer repeat units of tetrafluoroethylene and polymer repeat units of either hexafluoropropylene or pentafluoropropylene. Yet another composition of the invention contains polymer repeat units of vinylidene fluoride, polymer repeat units of perfluoroalkyl perfluorovinyl ether, and polymer repeat units of tetrafluoroethylene, optionally also containing repeat units of hexafluoropropylene.

In particular, and for the above described embodiments, component (b)(1) may contain 30–65 weight percent, preferably 30–60 weight percent vinylidene fluoride units; 20–45 weight percent, preferably 25–40 weight percent hexafluoropropylene units; and 0–35 weight percent, preferably 10–30 weight percent tetrafluoroethylene units. Alternatively, (b)(1) can also be composed of 15–65 weight percent, preferably 25–60 weight percent of vinylidene fluoride units; 0–55 weight percent, preferably 5–40 weight percent tetrafluoroethylene units; and, 25–45 weight percent preferably 30–45 weight percent, of perfluoroalkyl perfluorovinyl ether units having the formula $CF_2=CFO(CF_2CFXO)_nR_f$, where X is F or trifluoromethyl, n is 0–5 and $R_f$ is a perfluoroalkyl group of 1–6 carbon atoms. A preferred perfluoroalkyl perfluorovinyl ether is perfluoro(methyl vinyl ether), hereinafter referred to as PMVE. Alternatively, PMVE can be used in admixture with another perfluoroalkyl perfluorovinyl ether, so long as the total perfluoroalkyl perfluorovinyl ether content is in the range of 15–35 mole percent in the polymer.

In useful embodiments, component (b)(2) is composed of 10–40 mole percent, preferably 20–40 mole percent ethylene units; 32–60 mole percent tetrafluoroethylene units; and, 20–40 mole percent, preferably 20–35 mole percent of perfluoroalkyl perfluorovinyl ether units having the formula $CF_2=CFO(CF_2CFXO)_nR_f$, where X is F or trifluoromethyl, n is 0–5 and $R_f$ is a perfluoroalkyl group of 1–6 carbon atoms. A preferred perfluoroalkyl perfluorovinyl ether is PMVE. Alternatively, PMVE can be used in admixture with another perfluoroalkyl perfluorovinyl ether, so long as the total perfluoroalkyl perfluorovinyl ether content is in the range of 15–35 mole percent in the fluoroelastomer. In U.S. Pat. No. 4,694,045 a variety of perfluoro alkyl perfluorovinyl ethers are disclosed, and are incorporated herein by reference.

The elastomers described herein are prepared by free radical emulsion polymerization in a continuous stirred tank reactor. Polymerization temperatures may be in the range 40° to 130° C., preferably 70° to 115° C., at pressures of 2 to 8 MPa and residence times of 10 to 240 minutes. A residence time of 20 to 60 minutes is preferred for vinylidene fluoride copolymers. Free radical generation is effected using a water-soluble initiator such as ammonium persulfate, either by thermal decomposition or by reaction with a reducing agent such as sodium sulfite. Initiator levels are set low enough so that iodine end groups predominate over those from initiator fragments. This leads to the desired low polymer viscosity and contributes to good flow characteristics and good vulcanizate properties, including compression set resistance. The polymer dispersion is stabilized with an inert surface-active agent such as ammonium perfluorooctanoate, usually with addition of a base such as sodium hydroxide or a buffer such as disodium phosphate to control pH in the range 3 to 7. After polymerization, unreacted monomer is removed from the reactor effluent latex by vaporization at reduced pressure. The polymer is recovered from latex by coagulation, e.g., by reducing pH to about 3 by acid addition and adding a salt solution such as calcium nitrate, magnesium sulfate, or potassium aluminum sulfate in water, followed by separation of serum from polymer, washing with water, and drying of the wet polymer.

Fluoroelastomers made by the method described are generally cured by a free radical process. A curable composition comprises polymer and a peroxide to generate free radicals at curing temperatures. A dialkyl peroxide which decomposes at a temperature above 50° C. is especially preferred when the composition is to be processed at elevated temperatures before it is cured. In many cases one will prefer to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)butyl]carbonate.

Another material which is usually blended with the composition before it is made into end products is a coagent composed of a polyunsaturated compound which is capable of cooperating with the peroxide to provide a useful cure. These crosslinking coagents can be added in an amount equal to 0.5–10 percent, preferably about 1–7 percent, by weight of the copolymer content, and may be one or more of the following compounds: triallyl cyanurate; triallyl isocyanurate; tri(methallyl) isocyanurate; tris(diallylamine)-s-triazine; triallyl phosphite; N,N-diallyl acrylamide; hexaallyl phosphoramide; N,N,N',N'-tetraallyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate, hereafter called TAIC.

Optionally, at least one metal compound selected from divalent metal oxides or divalent metal hydroxides is frequently blended with the fluoroelastomer during preparation or before it is cured. The presence of such compounds improves the heat aging resistance and thermal stability of the polymer. Representative metal compounds include the oxides and hydroxides of magnesium, zinc, calcium or lead. A metal salt of a weak acid can also be used along with the oxide and/or hydroxide. Representative salts of weak acids include the barium-, sodium-, potassium-, lead-, and calcium-/-stearate, -benzoate, -carbonate, -oxalate and -phosphite. Magnesium and lead oxides are especially preferred. The metal compound is added to the fluoroelastomer in an amount equal to 1–15 weight percent, preferably 2–10 weight percent, based on fluoroelastomer.

The fluoroelastomers can also contain conventional fillers such as carbon black, clay, silica and talc. Other fillers, pigments, antioxidants, stabilizers and the like can also be used. It is particularly advantageous to add carbon black to the fluoroelastomer to increase its modulus. Usually amounts of from 5–50 parts per hundred parts of fluoroelastomer are used, with the particular amount determined from the particle size of the carbon black and the desired hardness of the cured composition.

As described hereinabove, the fluoroelastomer compositions of this invention have a unique structure in which free radical-reactive bromo-sites are randomly attached along the polymer chain and iodinated sites are at the chain ends. Thus, when this fluoroelastomer is crosslinked by the action of organic peroxides and crosslinking coagents, products are obtained having enhanced strength, compression set and ease of processibility that are useful in the preparation of injection molded shaft seals, gaskets and other molded parts.

The subject invention will be more fully appreciated with reference to the following examples.

EXAMPLES

EXAMPLE 1

A continuous emulsion polymerization was carried out in a well-stirred 4.0-liter stainless steel reaction vessel. The reactor was filled with an aqueous solution containing 0.48 g ammonium persulfate (APS), 0.30 g sodium hydroxide, and 0.75 g ammonium perfluorooctanoate (FC-143) soap per liter of deionized water. The reactor was heated to 110° C. and the aqueous solution was fed at 6.0 L/h. The reactor was kept liquid-full at 6.2 MPa by means of a back-pressure control valve in the effluent line. After 30 minutes the reaction was started by introducing a gaseous monomer mixture consisting of 315 g/h tetrafluoroethylene (TFE), 389 g/h vinylidene fluoride (VF$_2$), and 644 g/h of hexafluoropropylene (HFP) fed through a diaphragm compressor. After 15 minutes a feed was established of a mixture of 6.9 g/h BTFB and 3.4 g/h of 1,4-diiodoperfluorobutane (total solution feed 5.6 mL/h). After 2 hours, effluent dispersion was collected for 8.5 hours.

The effluent polymer dispersion was separated from residual monomers in a degassing vessel at atmospheric pressure. The dispersion had pH=4.0 and contained 15.6 weight percent solids. The fluoroelastomer was isolated from the dispersion by reducing pH to about 3 with dilute sulfuric acid and coagulating with potassium aluminum sulfate solution. The coagulated polymer was allowed to settle, supernatant serum was removed, and the polymer was washed by reslurrying in water twice before filtering. The wet crumb was dried in an air oven at 50°–60° C. to a moisture content of less than 1%.

About 9 kg of polymer was recovered at an overall conversion of 81%. The polymer had the composition 28% TFE, 34% VF$_2$, 37% HFP, and 0.6% BTFB, and also contained 0.15% iodine, corresponding to about 90% of that fed in diiodoperfluorobutane. The polymer was an amorphous fluoroelastomer with glass transition temperature −9° C., as determined by differential scanning calorimetry (heating mode, 10° C./min, onset of transition). Fluoroelastomer inherent viscosity was 0.36 dL/g, measured at 30° C. in methyl ethyl ketone, and Mooney viscosity was measured as ML-10 (100° C.)=56.

The number average molecular weight, $M_n$, was determined to be 68,100 Daltons by membrane osmometry measurements in methyl ethyl ketone. From this information and the analyses for bromine and iodine, it was calculated that the average polymer chain contained 2.1 bromine atoms per chain and 0.9 iodine atoms per chain. The ratio of weight average to number average molecular weight, $M_w/M_n$ was estimated from molecular weight determinations in dimethylacetamide solvent at 135° C. using a Waters Associates Gel Permeation Chromatograph. Data are shown in Table I.

A curable fluoroelastomer composition was prepared by mixing the following ingredients on a two-roll rubber mill whose rolls were heated to about 25° C.: 100 parts fluoroelastomer of Example 1, 30 parts MT (N990) carbon black, 3 parts Maglite Y magnesium oxide, 3 parts TAIC, and 3 parts "Luperco" 101-XL peroxide (45% of 2,5-dimethyl-2,5-di(t-butyl peroxy)hexane and 55% inert filler). Cure characteristics of the composition were measured with an oscillating disk rheometer (ODR) at a cure time of 12 minutes at 177° C., according to ASTM D-2084 (1 deg. arc). The time required to reach a torque increase (from the minimum)

of 0.2 Joule, $t_s$ (0.2), was 1.4 minutes and the time required to reach 90% of the cure state reached in 12 minutes was determined as t'90=3.8 minutes. Test samples were press-cured for 10 minutes at 177° C. and post-cured in a circulating air oven for 24 hours at 200° C. Stress-strain properties were determined according to ASTM D-412 as: 100% modulus, $M_{100}$=4.5 MPa; tensile at break, $T_B$=15.9 MPa; elongation at break, $E_B$=260%. Compression set, measured on pellets in air, was 67% after 70 hours at 200° C. The results are reported in Tables I and II.

EXAMPLES 2 AND 3

Fluoroelastomers 2 and 3 were made by continuous emulsion polymerization in a well-stirred 4.0-liter reaction vessel, as in Example 1, and are further described in Table I. Properties of the cured fluoroelastomers are shown in Table II.

COMPARATIVE EXAMPLE A

A fluoroelastomer was prepared as in Examples 1-3, except that BTFB was not fed to the reaction mixture, giving a fluoroelastomer characterized as shown in Table I and having the vulcanizate properties shown in Table II.

EXAMPLES 4-6

Elastomeric copolymers of TFE, VF2, PMVE, and BTFB were prepared by continuous emulsion polymerizations as in Example 1, with PMVE monomer used in place of HFP. Startup and general operation were as described in previous examples. Polymerization conditions and characterization of the bromine- and iodine-containing TFE/VF2/PMVE fluoroelastomers are shown in Table III. Properties of the cured fluoroelastomers are shown in Table IV.

COMPARATIVE EXAMPLE B

A fluoroelastomer was prepared as in Examples 4-6, except that isopropyl alcohol was used as modifier in place of diiodoperfluorobutane, giving a fluoroelastomer characterized as shown in Table III and having the vulcanizate properties shown in Table IV.

EXAMPLE 7

An elastomeric copolymer of ethylene, TFE, PMVE, and BTFB was made by continuous emulsion polymerization at 90° C. as in Examples 1-3. Startup and general operation were as described in previous examples. Aqueous solution was fed to a 4-liter reactor at 1.2 L/h to maintain solute feeds of 1.13 g/h APS initiator, 12 g/h disodium phosphate heptahydrate, and 7.0 g/h FC-143 soap. Gaseous monomers were fed at 30 g/h ethylene, 178 g/h TFE, and 257 g/h PMVE. BTFB curesite monomer was fed at 2.6 g/h and 1,4-diiodoperfluorobutane at 1.6 g/h in tertiary-butanol solution. After 4 hours equilibration, effluent dispersion was collected for 8.5 hours. The dispersion had pH=6.5 and contained 23% solids. Dispersion pH was adjusted to about 3 by addition of dilute nitric acid and the polymer was coagulated by adding calcium nitrate solution, then washed and dried as in Example 1. About 3.4 kg polymer was recovered at overall conversion 72%. Polymer composition was 8.7% ethylene, 46% TFE, 44% PMVE, and 0.7% BTFB, and contained 0.16% iodine.

A curable fluoroelastomer composition was prepared by mixing the following ingredients on a two-roll rubber mill whose rolls were heated to about 25° C. 100 parts fluoroelastomer, 30 parts MT (N990) black, 3 parts litharge, 3 parts triallyl isocyanurate (TAIC), and 3 parts "Luperco" 101-XL peroxide (45% of 1,5-dimethyl-1,5-di(t- butyl peroxy)hexane and 55% inert filler). Cure characteristics of the composition were measured with an oscillating disk rheometer (ODR) at a cure time of 12 minutes at 177° C., according to ASTM D-2084, and had the following values: $M_L$=0.45 joule, $M_H$=3.05 joules, $t_s$(0.2)=1.4 min and t'90=7.2 min. Test samples were press-cured for 15 min at 177° C. and post-cured in a circulating air oven for 24 hrs at 232° C. Stress-strain properties were determined according to ASTM D-412 as: 100% modulus, M100=5.0 MPa, TB=13.1 MPa and elongation at break, EB=220%. Compression set, measured on pellets in air, was 58% after 70 hrs at 200° C.

TABLE I

| Example | 1 | 2 | 3 | Comparative A |
|---|---|---|---|---|
| Aq. sol'n, L/h | 6 | 4 | 4 | 4 |
| APS, g/h | 2.87 | 1.6 | 1.16 | 1.6 |
| NaOH, g/h | 1.8 | 1.2 | 0.8 | 1.2 |
| FC-143, g/h | 4.5 | 4 | 4 | 4 |
| I(CF$_2$)$_4$I, g/h | 3.4 | 3.8 | 4.4 | 3.8 |
| Monomer feed, g/h | | | | |
| TFE | 315 | 242 | 217 | 254 |
| VF2 | 389 | 299 | 268 | 316 |
| HFP | 644 | 489 | 437 | 523 |
| BTFB | 6.9 | 5.3 | 4.8 | — |
| Dispersion | | | | |
| % Solids | 15.6 | 17.8 | 15.7 | 18.6 |
| pH | 4.0 | 3.9 | 3.2 | 4.1 |
| Pol. rate, g/h | 1097 | 857 | 738 | 906 |
| Conversion, % | 81 | 82 | 79 | 83 |
| Polymer Composition, wt. % | | | | |
| VF2 | 34 | 34 | 35 | 34 |
| TFE | 28 | 27 | 28 | 27 |
| HFP | 37 | 38 | 36 | 38 |
| BTFB | 0.63 | 0.62 | 0.65 | — |
| % Br | 0.24 | 0.24 | 0.25 | 0 |
| % I | 0.15 | 0.2 | 0.25 | 0.21 |
| Viscosity | | | | |
| ML-10 (100° C.) | 56 | 54 | 37 | 52 |
| Inh. Visc. | 0.36 | 0.36 | 0.36 | 0.34 |
| M$_n$ by Osmometry, Dalton | 68,100 | 76,900 | 66,300 | 70,000 |
| M$_w$/M$_n$, by GPC | 2.1 | 1.9 | 1.9 | 1.8 |
| Br/chain | 2.1 | 2.3 | 2.1 | 0 |
| I/chain | 0.9 | 1.5 | 1.8 | 1.2 |
| DSC: Tg, °C. | −9 | −10 | −13 | −8 |

TABLE II

| Example | 1 | 2 | 3 | Comparative A |
|---|---|---|---|---|
| Recipe, phr | | | | |
| MT black | 30 | 30 | 30 | 30 |
| Maglite Y | 3 | 3 | 3 | 3 |
| Peroxide | 3 | 3 | 3 | 3 |
| TAIC | 3 | 3 | 3 | 3 |
| ODR, 177° C. | | | | |
| ML, joules | 0.34 | 0.57 | 0.34 | 0.57 |
| MH, joules | 2.83 | 5.42 | 5.99 | 5.31 |
| ts(0.2), min | 1.4 | 1.2 | 1.2 | 1.2 |
| t'90, min | 3.8 | 3.5 | 3.0 | 2.5 |
| Press Cure, min/177° C. | 10 | 10 | 10 | 10 |
| Post Cure 24 hrs, Temp., °C. | 200 | 200 | 200 | 200 |
| Stress-strain | | | | |
| M100, MPa | 4.5 | 6.4 | 7.8 | 5.8 |
| TB, MPa | 15.9 | 17.6 | 18.5 | 17.6 |
| EB, % | 260 | 200 | 180 | 230 |
| Compression Set, (%) Pellets, 70h/200° C. | 67 | 46 | 38 | 59 |

TABLE III

| Example | 4 | 5 | 6 | Comparative B |
|---|---|---|---|---|
| Aq. sol'n, L/h | 6 | 6 | 6 | 6 |
| APS, g/h | 2.12 | 2.12 | 2.21 | 3.77 |
| NaOH, g/h | 0.8 | 0.8 | 1 | 2.0 |
| FC-143, g/h | 4 | 4 | 4 | 4 |
| I(CF$_2$)$_4$I, g/h | 8.4 | 5.6 | 4.2 | 0 |
| Isopropyl alchohol, g/h | — | — | — | 1.35 |
| Monomer feed, g/h | | | | |
| TFE | 341 | 365 | 363 | 407 |
| VF2 | 497 | 496 | 504 | 570 |
| PMVE | 655 | 645 | 647 | 695 |
| BTFB | 11.3 | 11.3 | 16.9 | 18.0 |
| Dispersion | | | | |
| % Solids | 18.7 | 18.5 | 18.7 | 21.1 |
| pH | 3.6 | 3.3 | 4.0 | 4.7 |
| Pol. rate, g/h | 1377 | 1354 | 1373 | 1589 |
| Conversion, % | 91 | 89 | 89 | 94 |
| Polymer Composition, wt. % | | | | |
| VF2 | 35 | 35 | 35 | 35 |
| TFE | 24 | 26 | 25 | 25 |
| PMVE | 40 | 38 | 38 | 39 |
| BTFB | 0.82 | 0.83 | 1.23 | 1.13 |
| % Br | 0.32 | 0.32 | 0.47 | 0.44 |
| % I | 0.30 | 0.22 | 0.15 | 0 |
| Viscosity | | | | |
| ML-10 (100° C.) | 18 | 32 | 50 | 74 |
| Inh. Visc. | 0.39 | 0.43 | 0.47 | 0.57 |
| M$_n$ by Osmometry, Daltons | 57,200 | 70,000 | 87,000 | — |
| M$_w$/M$_n$, by GPC | 1.8 | 2.0 | 2.2 | — |
| Br/chain | 2.3 | 2.8 | 5.2 | — |
| I/chain | 1.5 | 1.3 | 1.2 | — |
| DSC: Tg, °C. | −27 | −27 | −26 | −23 |

TABLE IV

| Example | 4 | 5 | 6 | Comparative B |
|---|---|---|---|---|
| Recipe, phr | | | | |
| MT black | 30 | 10 | 30 | 30 |
| Nyad 400 (calcium silicate) | — | 25 | — | — |
| Maglite Y | 3 | 3 | 3 | 3 |
| Peroxide | 1.5 | 1.5 | 1.5 | 3 |
| TAIC | 1.5 | 1.5 | 1.5 | 1.5 |
| ODR, 177° C. | | | | |
| ML, joules | 0.15 | — | 0.66 | 0.99 |
| MH, joules | 5.31 | — | 5.31 | 3.26 |
| ts(0.2), min | 1.3 | — | 1.1 | 1.4 |
| t'90, min | 3.4 | — | 3.8 | 6.1 |
| Press Cure, min at 177° C. | 10 | 6 | 10 | 10 |
| Post Cure 24 hrs. Temp., °C.: | 200 | 200 | 200 | 200 |
| Stress-strain | | | | |
| M100, Mpa | 5.2 | 4.7 | 5.6 | 3.1 |
| TB, MPa | 14.0 | 11.2 | 13.4 | 10.8 |
| EB, % | 180 | 250 | 160 | 250 |
| Compression Set, Pellets, 70h/200° C. | 33 | — | 33 | 57 |

I claim:

1. A composition comprising a peroxide curable fluoroelastomer prepared by continuous emulsion polymerization in the presence of iodinated compounds of the formula RI$_n$, where R is a radical of 1–8 carbon atoms and selected from the group consisting of fluorocarbons and chlorofluorocarbons, I is iodine, and n is 1 or 2, said iodine being bonded at a substantial number of terminal positions on the fluoroelastomer, the amount of iodinated compound being sufficient to provide at least 0.1 weight percent iodine in the fluoroelastomer, comprising:
  (a) up to 3 weight percent, based on the total weight of components (a) and (b), of polymer repeat units selected from the group consisting of fluoroolefins and fluorovinyl ethers, said units containing bromine and being present in an amount present to provide 0.1–1.0 weight percent bromine in the fluoroelastomer; and
  (b) complementally, at least 97 weight percent, based on the total weight of components (a) and (b), of:
    (1) polymer repeat units of vinylidene fluoride, and polymer repeat units of one or more fluoroolefins copolymerizable therewith, said fluoroolefins containing 2–8 carbon atoms and at least as many fluorine atoms as carbon atoms, optionally, polymer repeat units provided by or
    (2) 32–60 mole percent of polymer repeat units of tetrafluoroethylene, 20–40 mole percent of polymer repeat units of perfluoroalkyl perfluorovinyl ethers, and 10–40 mole percent of polymer repeat units of ethylene.

2. The composition of claim 1 wherein the fluoroelastomer contains from 0.1 to 0.5 weight percent iodine.

3. The composition of claim 1 wherein the fluoroelastomer contains from 0.15 to 0.6 weight percent bromine.

4. The composition of claim 1 wherein the fluoroolefin of (a) is 4-bromo-3,3,4,4-tetrafluorobutene-1.

5. The composition of claim 1 wherein the fluorovinyl ether of (a) has the formula CF$_2$Br—R—O—CF=CF$_2$ or ROCF=CFBr, where R is a lower alkyl group or fluoroalkyl group.

6. The composition of claim 1 wherein (b)(1) consists of polymer repeat units of vinylidene fluoride and polymer repeat units of a fluoroolefin selected from the group consisting of hexafluoropropylene and pentafluoropropylene.

7. The composition of claim 1 wherein (b)(1) consists of polymer repeat units of vinylidene fluoride, polymer repeat units of tetrafluoroethylene, and polymer repeat units of fluoroolefins selected from the group consisting of hexafluoropropylene and pentafluoropropylene.

8. The composition of claim 7 wherein (b)(1) is comprised of 30–65 weight percent of polymer repeat units of vinylidene fluoride, 0–35 weight percent of polymer repeat units of tetrafluoroethylene, and 20–45 weight percent of polymer repeat units of hexafluoropropylene.

9. The composition of claim 7 wherein (b)(1) is comprised of 30–60 weight percent of polymer repeat units of vinylidene fluoride, 10–30 weight percent of polymer repeat units of tetrafluoroethylene, and 25–40 weight percent of polymer repeat units of hexafluoropropylene.

10. The composition of claim 1 wherein (b)(1) consists of polymer repeat units of vinylidene fluoride, polymer repeat units of perfluoroalkyl perfluorovinyl ether, polymer repeat units of tetrafluoroethylene, and optionally, polymer repeat units of hexafluoropropylene.

11. The composition of claim 10 wherein (b)(1) is comprised of 15–65 weight percent of polymer repeat units of vinylidene fluoride, 0–55 weight percent of polymer repeat units of tetrafluoroethylene, and 25–45 weight percent of polymer repeat units of perfluoroalkyl perfluorovinyl ether.

12. The composition of claim 10 wherein (b)(1) is comprised of 25–60 weight percent of polymer repeat units of vinylidene fluoride, 5–40 weight percent of polymer repeat units of tetrafluoroethylene, and 30–45 weight percent of polymer repeat units of perfluoroalkyl perfluorovinyl ether.

13. The composition of claim 1 wherein (b)(1) contains units of a perfluoroalkyl perfluorovinyl ether of the formula $CF_2=CFO(CF_2CFXO)_nR_f$, where X is F or trifluoromethyl, n is 0–5 and $R_f$ is a perfluoroalkyl group of 1–6 carbon atoms.

14. The composition of claim 13 wherein the perfluoroalkyl perfluorovinyl ether is perfluoro(methyl vinyl ether).

15. The composition of claim 1 wherein (b)(1) contains two perfluoroalkyl perfluorovinyl ethers, where one ether is perfluoro(methyl vinyl ether), and the total content of the perfluoroalkyl perfluorovinyl ethers is 15–35 mole percent in the fluoroelastomer.

16. The composition of claim 1 wherein component (b)(2) consists of 32–60 mole percent of polymer repeat units of tetrafluorethylene, 20–40 mole percent of polymer repeat units of perfluroalkyl perfluorovinyl ether, and 10–40 mole percent of polymer repeat units of ethylene.

17. The composition of claim 1 wherein (b)(2) consists of 32–60 mole percent of polymer repeat units of tetrafluoroethylene, 20–35 mole percent of polymer repeat units of perfluoroalkyl perfluorovinyl ether, and 20–40 mole percent of polymer repeat units of ethylene.

18. The composition of claim 1 wherein the perfluoroalkyl perfluorovinyl ether of (b)(2) has the formula $CF_2=CFO(CF_2CFXO)_nR_f$, where X is F or trifluoromethyl, n is 0–5 and $R_f$ is a perfluoroalkyl group of 1–6 carbon atoms.

19. The composition of claim 18 wherein the perfluoroalkyl perfluorovinyl ether is perfluoro(methyl vinyl ether).

20. The composition of claim 1 wherein (b)(2) contains two perfluoroalkyl perfluorovinyl ethers, where one ether is perfluoro(methylvinyl ether), and the total content of the perfluoroalkyl perfluorovinyl ethers is 15–35 mole percent in the fluoroelastomer.

21. The composition of claim 1 wherein the iodinated compound is a perhalogenated diiodide.

22. The composition of claim 21 wherein the perhalogenated diiodide is selected from the group consisting of 1,3-diiodoperfluoro-n-propane, 1,4-diiodoperfluoro-n-butane, 1,3-diiodo-2-chloroperfluoro-n-propane, and 1,5-diiodo-2,4-dichloro-perfluoro-n-pentane.

* * * * *